United States Patent
Kalla et al.

(10) Patent No.: US 7,401,208 B2
(45) Date of Patent: Jul. 15, 2008

(54) METHOD AND APPARATUS FOR RANDOMIZING INSTRUCTION THREAD INTERLEAVING IN A MULTI-THREAD PROCESSOR

(75) Inventors: Ronald Nick Kalla, Round Rock, TX (US); Minh Michelle Quy Pham, Austin, TX (US); Balaram Sinharoy, Poughkeepsie, NY (US); John Wesley Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 10/424,533

(22) Filed: Apr. 25, 2003

(65) Prior Publication Data

US 2004/0215947 A1 Oct. 28, 2004

(51) Int. Cl.
  *G06F 9/44* (2006.01)
  *G06F 9/46* (2006.01)
(52) U.S. Cl. .................. 712/224; 712/206; 718/103
(58) Field of Classification Search .......... 718/100, 718/103, 108; 712/239, 245, 206, 215, 224; 717/140, 157
See application file for complete search history.

(56) References Cited

U.S. PATENT DOCUMENTS

| | | | |
|---|---|---|---|
| 4,642,756 | A | 2/1987 | Sherrod |
| 5,655,115 | A * | 8/1997 | Shen et al. .................. 712/239 |
| 6,073,159 | A | 6/2000 | Emer et al. |
| 6,076,157 | A | 6/2000 | Borkenhagen et al. |
| 6,212,544 | B1 | 4/2001 | Borkenhagen et al. |
| 6,341,347 | B1 | 1/2002 | Joy et al. |
| 6,477,562 | B2 * | 11/2002 | Nemirovsky et al. ........ 718/108 |

(Continued)

FOREIGN PATENT DOCUMENTS

EP 0 790 557 A2 8/1997

(Continued)

OTHER PUBLICATIONS

Lau "Performance Analysis of Variable Rate: Symbol-by-Symbol Adaptive Bit Interleaved Coded Modulation for Rayleigh fading Channels" 2002 IEEE, pp. 537-550.*

(Continued)

*Primary Examiner*—Van H Nguyen
(74) *Attorney, Agent, or Firm*—Casimer K. Salys; Russell D. Culbertson; The Culbertson Group, P.C.

(57) ABSTRACT

A processor interleaves instructions according to a priority rule which determines the frequency with which instructions from each respective thread are selected and added to an interleaved stream of instructions to be processed in the data processor. The frequency with which each thread is selected according to the rule may be based on the priorities assigned to the instruction threads. A randomization is inserted into the interleaving process so that the selection of an instruction thread during any particular clock cycle is not based solely by the priority rule, but is also based in part on a random or pseudo random element. This randomization is inserted into the instruction thread selection process so as to vary the order in which instructions are selected from the various instruction threads while preserving the overall frequency of thread selection (i.e. how often threads are selected) set by the priority rule.

11 Claims, 3 Drawing Sheets

U.S. PATENT DOCUMENTS

| | | | |
|---|---|---|---|
| 6,526,421 B1 * | 2/2003 | Houldsworth | 707/206 |
| 6,658,447 B2 | 12/2003 | Cota-Robles | |
| 6,674,536 B2 * | 1/2004 | Long et al. | 358/1.15 |
| 6,857,004 B1 * | 2/2005 | Howard et al. | 709/201 |
| 6,910,110 B2 * | 6/2005 | Kim et al. | 711/157 |
| 6,981,261 B2 | 12/2005 | Kalafatis et al. | |
| 7,082,519 B2 * | 7/2006 | Kelsey et al. | 712/228 |
| 7,210,134 B1 * | 4/2007 | Langer | 717/140 |
| 2001/0056456 A1 | 12/2001 | Cota-Robles | |
| 2002/0103990 A1 | 8/2002 | Potash | |
| 2005/0183072 A1 * | 8/2005 | Horning et al. | 717/140 |

FOREIGN PATENT DOCUMENTS

| | | |
|---|---|---|
| JP | 09/282184 | 10/1997 |
| JP | 10-124316 | 5/1998 |
| JP | 2000-020323 | 1/2000 |
| JP | 2001-306323 | 11/2001 |
| WO | WO 02/067116 A2 | 8/2002 |

OTHER PUBLICATIONS

Chang et al. "The Effects of Explicitly Parallel Mechanisms on the Multi-ALU Processor Cluster Pepline" 1998 IEEE, pp. 474-481.*

Laudon et al. "Interleaving: A Multithreading Technique Targeting Multiprocessors and Worksatations" 1994 ACM, pp. 308-318.*

Darmon et al. "A New Psedo-Random Interleaving for Antijamming Applications" 1989 IEEE, pp. 0006-0010.*

Utiyama et al., "Design and Implementation of Multithreaded Processor for Real-Time Operation," Technical Report of IEICE (Mar. 22, 2002), pp. 29-36, vol. 99(725).

Snavely et al., "Symbiotic Jobscheduling with Priorities for a Simultaneous Multithreading Processor," SIGMETRICS Conf. Measurement and Modeling of C.S. (Jun. 2002), pp. 66-76.

Fisk et al., "Thread-Prioritization: A Thread Scheduling Mechanism for Multiple-Context Parallel Processors," First International Symposium of High Performance Computer Architecture (Raleigh, NC, Jan. 1995), pp. 210-221.

* cited by examiner

METHOD AND APPARATUS FOR RANDOMIZING INSTRUCTION THREAD INTERLEAVING IN A MULTI-THREAD PROCESSOR

RELATED APPLICATIONS

This application is related to U.S. application Ser. No. 10/424,529, entitled "APPARATUS AND METHOD FOR ADJUSTING INSTRUCTION THREAD PRIORITY IN A MULTI-THREAD PROCESSOR" and U.S. application Ser. No. 10/424,530, entitled "METHOD AND APPARATUS FOR SELECTING AN INSTRUCTION THREAD FOR PROCESSING IN A MULTI-THREAD PROCESSOR," each filed simultaneously herewith. The entire content of each of these related applications is hereby incorporated by reference into the present application.

TECHNICAL FIELD OF THE INVENTION

This invention relates to processors capable of processing multiple instruction threads. More particularly, the invention relates to an apparatus and process that introduces a randomization into the manner in which instruction threads are interleaved for processing, while maintaining some desired overall ratio or degree of interleaving between instruction threads.

BACKGROUND OF THE INVENTION

A number of techniques are used to improve the speed at which data processors execute software programs. These techniques include increasing the processor's clock speed, using cache memory, and using predictive branching. Increasing the processor clock speed allows a processor to perform relatively more operations in any given period of time. Cache memory is positioned in close proximity to the processor and operates at higher speeds than main memory, thus reducing the time needed for a processor to access data and instructions. Predictive branching allows a processor to execute certain instructions based on a prediction about the results of an earlier instruction, thus obviating the need to wait for the actual results and thereby improving processing speed.

Some processors also employ pipelined instruction execution to enhance system performance. In pipelined instruction execution, processing tasks are broken down into a number of pipeline steps or stages. Pipelining may increase processing speed by allowing subsequent instructions to begin processing before previously issued instructions have finished a particular process. The processor does not need to wait for one instruction to be fully processed before beginning to process the next instruction in the sequence.

Processors that employ pipelined processing may include a number of different pipeline stages which are devoted to different activities in the processor. For example, a processor may process sequential instructions in a fetch stage, decode/dispatch stage, issue stage, execution stage, finish stage, and completion stage. Each of these individual stages my employ its own set of pipeline stages to accomplish the desired processing tasks.

Multi-thread instruction processing is an additional technique that may be used in conjunction with pipelining to increase processing speed. Multi-thread instruction processing involves dividing a set of program instructions into two or more distinct groups or threads of instructions. This multi-threading technique allows instructions from one thread to be processed through a pipeline while another thread may be unable to be processed for some reason. This avoids the situation encountered in single-threaded instruction processing in which all instructions are held up while a particular instruction cannot be executed, such as, for example, in a cache miss situation where data required to execute a particular instruction is not immediately available. Data processors capable of processing multiple instruction threads are often referred to as simultaneous multithreading (SMT) processors.

It should be noted at this point that there is a distinction between the way the software community uses the term "multithreading" and the way the term "multithreading" is used in the computer architecture community. The software community uses the term "multithreading" to refer to a single task subdivided into multiple, related threads. In computer architecture, the term "multithreading" refers to threads that may be independent of each other. The term "multithreading" is used in this document in the same sense employed by the computer architecture community.

To facilitate multithreading, the instructions from the different threads are interleaved in some fashion at some point in the overall processor pipeline. There are generally two different techniques for interleaving instructions for processing in a SMT processor. One technique involves interleaving the threads based on some long latency event, such as a cache miss that produces a delay in processing one thread. In this technique all of the processor resources are devoted to a single thread until processing of that thread is delayed by some long latency event. Upon the occurrence of the long latency event, the processor quickly switches to another thread and advances that thread until some long latency event occurs for that thread or if the circumstance that stalled the other thread is resolved.

The other general technique for interleaving instructions from multiple instruction threads in a SMT processor involves interleaving instructions on a cycle-by-cycle basis according to some interleaving rule. A simple cycle-by-cycle interleaving technique may simply interleave instructions from the different threads on a one-to-one basis. For example, a two-thread SMT processor may take an instruction from a first thread in a first clock cycle, an instruction from a second thread in a second clock cycle, another instruction from the first thread in a third clock cycle and so forth, back and forth between the two instruction threads. A more complex cycle-by-cycle interleaving technique may involve assigning a priority (commonly via software) to each instruction thread and then interleaving to enforce some rule based upon the relative thread priorities. For example, if one thread in a two-thread SMT processor is assigned a higher priority than the other thread, a simple interleaving rule may require that twice as many instructions from the higher priority thread be included in the interleaved stream as compared to instructions from the lower priority thread.

A more complex cycle-by-cycle interleaving rule in current use assigns each thread a priority from "1" to "7" and places an element of the lower priority thread into the interleaved stream of instructions based on the function $1/(2^{|X-Y|+1})$, where X=the software assigned priority of a first thread, and Y=the software assigned priority of a second thread. In the case where two threads have equal priority, for example, X=3 and Y=3, the function produces a ratio of ½, and an instruction from each of the two threads will be included in the interleaved instruction stream once out of every two clock cycles. If the threads' priorities differ by 2, for example, X=2 and Y=4, then the function produces a ratio of ⅛, and an instruction from the lower priority thread will be included in the interleaved instruction stream once out of every eight clock cycles.

There are, however, occasional situations or scenarios in which the enforcement of a priority rule may lead to a conflict that will interfere with the advancement of either thread into the interleaved stream. In these situations, commonly referred to as "live lock" situations, instructions from the different threads are interleaved according to a priority rule in a cyclical fashion that ends up stalling all of the different instruction threads. For example, instructions from different instruction threads in a multi-thread processor may both need a resource that is shared between them. In this case, cyclically interleaving instructions from the various threads according to a priority rule may cause the instructions to effectively block each other from gaining access to the resource and thus cause the processor to stall.

SUMMARY OF THE INVENTION

The present invention includes apparatus and methods for interleaving instructions from multiple instruction threads in a data processor. Instructions are interleaved according to a priority rule which determines the frequency with which instructions from each respective thread are selected and added to an interleaved stream of instructions to be processed in the data processor. The frequency with which each thread is selected according to the rule may be based on the priorities assigned to the instruction threads. According to the invention, a randomization is inserted into the interleaving process so that the selection of an instruction thread during any particular clock cycle is not based solely by the priority rule, but is also based in part on a random or pseudo random element. This randomization is inserted into the instruction thread selection process so as to vary the order in which instructions are selected from the various instruction threads while preserving the overall frequency of thread selection (i.e., how often threads are selected) set by the priority rule. Inserting the randomization into the thread selection process minimizes the likelihood of a live lock scenario, yet maintains the desired overall thread selection frequency determined by the priority rule.

A thread selection output that selects threads based on both a priority rule and random or pseudo random element can be generated by a selection controller including an interleave rule enforcement component and a randomization component. The rule enforcement component generates a base thread selection output signal incorporating the priority rule. The rule enforcement component delivers this base thread selection output signal to a randomization component, which inserts a randomization to generate a final selection output signal. The final selection output signal, therefore, reflects both the priority rule established in the rule enforcement component, and the randomization inserted by the randomization component.

While the invention may be implemented using discreet rule enforcement and randomization components, a preferred form of the invention is a circuit combining the interleave rule enforcement component with the randomization component. The combined circuit, in one form of the invention, generates a thread selection signal including a mask. In a preferred implementation, mask logic generates the mask using multiple priority signals associated with particular instruction threads. The priority signals are usually generated by software, and each priority signal indicates a priority assigned to a respective instruction thread. For example, if two priority signals are used to generate a mask, one of the priority signals will indicate the priority of a first instruction thread, and the other priority signal will indicate the priority of a second instruction thread. In at least one instance of the invention, the mask is generated by comparing the two priority signals to determine the difference between the priorities of the two associated instruction threads. The mask thus generated takes into account the priority of both instruction threads, and the multiplexer controller can use the mask to set a thread interleave ratio according to a desired priority rule.

Comparison logic, which forms part of the combined circuit, inserts a randomization into the thread interleaving processes. The comparison logic compares a random or pseudo random number produced by a random or pseudo random number generator to the mask generated by the mask logic, and produces a randomized mask. The randomized mask takes into account thread priorities, while at the same time ensuring that a particular thread is chosen for processing in a randomized fashion.

These and other advantages and features of the invention will be apparent from the following description of the preferred embodiments, considered along with the accompanying drawings.

DESCRIPTION OF PREFERRED EMBODIMENTS

Figure 1:
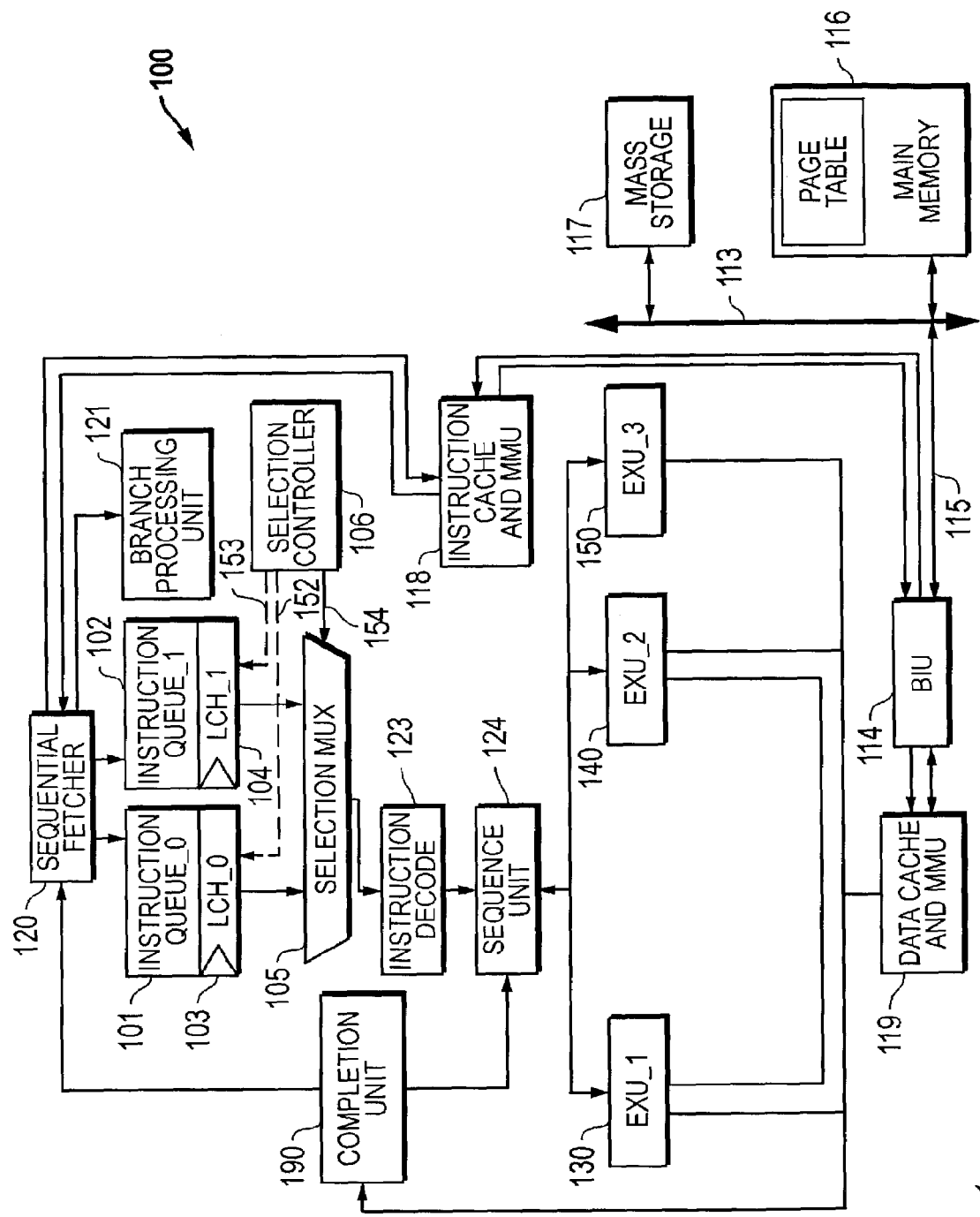
FIG. 1 is a block diagram of a processor employing an instruction interleaving arrangement embodying the principles of the present invention.

FIG. 1 illustrates a processor 100 embodying the principles of the invention. Processor 100 accommodates multithreading and includes a first instruction queue 101 (Queue_0), a second instruction queue 102 (Queue_1), selection multiplexer (MUX) 105, and selection controller 106. Each instruction queue 101 and 102 is dedicated to handling instructions in a respective thread of instructions. More particularly, first instruction queue 101 queues instructions from a first instruction thread T0 while second instruction queue 102 queues instructions from a second instruction thread T1. A sequential fetcher 120 transfers instructions making up the two different instruction threads from instruction cache and memory management unit (MMU) 118 to instruction queues 101 and 102. Instruction queues 101 and 102 ultimately feed their respective instructions to the two inputs of selection MUX 105. Selection controller 106 controls selection MUX 105 to interleave instructions from the two different instruction threads into a single interleaved stream of instructions for further processing.

As will be described further below with reference to FIGS. 2 and 3, each instruction thread is assigned a priority and selection controller 106 uses these priorities to enforce a rule regarding the frequency with which instructions from each queue (101 or 102) are placed in the interleaved stream for processing. Selection controller 106 also adds a randomization to the instruction thread selection to help avoid live lock scenarios in processing the interleaved instruction stream. The output of selection controller 106 comprises a control signal applied to thread selection control output 154. This control signal on thread selection control output 154 specifies which input of selection MUX 105 is to be passed on for further processing during a particular clock cycle. Since each input of selection MUX 105 is coupled to an instruction queue containing instructions from different threads, selecting a particular input of selection MUX 105 has the effect of selecting a particular instruction thread for processing.

In the illustrative embodiment shown in FIG. 1, processor 100 comprises a single integrated circuit superscalar microprocessor. Accordingly, processor 100 includes various execution units, registers, buffers, memory devices, and other functional units, which are all formed by integrated circuitry. Of course, although the invention is described herein as applied to a microprocessor, the present selection controller arrangement is not limited to microprocessors and may be implemented in other types of processors. Also, the general processor arrangement shown in FIG. 1 is shown only for purposes of example in explaining the operation of selection controller 106 in relation to first instruction queue 101, second instruction queue 102, and selection MUX 105. Those skilled in the art will appreciate that the selection controller described and claimed in this document may be utilized in substantially any processor arrangement capable of supporting simultaneous multiple instruction thread processing.

The processor 100 shown in FIG. 1 is coupled to system bus 113 via bus interface unit (BIU) 114 and processor bus 115. Both system bus 113 and processor bus 115 include address, data, and control buses which are not shown separately. BIU 114 participates in bus arbitration to control the transfer of information between processor 100 and other devices coupled to system bus 113, such as main memory 116 and non-volatile mass storage 117. The data processing system illustrated in FIG. 1 preferably includes other devices coupled to system bus 113; however, these other devices are not necessary for an understanding of the invention and are accordingly omitted from the drawings so as not to obscure the invention in unnecessary detail.

BIU 114 is connected to instruction cache and MMU (memory management unit) 118 and data cache and MMU 119. High-speed caches, such as those within instruction cache and MMU 118 and data cache and MMU 119, enable processor 100 to achieve relatively fast access to a subset of data or instructions previously transferred from main memory 116 to the caches, thus improving the overall processing speed. Data and instructions stored within the data cache 119 and instruction cache 118, respectively, are each identified and accessed by an effective address, which is related to the real address of the respective data or instruction in main memory 116.

Instruction cache and MMU 118 is further coupled to sequential fetcher 120, which fetches instructions for execution from instruction cache and MMU 118 during each processor cycle. Sequential fetcher 120 transmits branch instructions fetched from instruction cache and MMU 118 to branch processing unit (BPU) 121 for execution, and temporarily stores sequential instructions in first instruction queue 101 and second instruction queue 102 for eventual transfer to instruction decode unit 123 for decoding, and sequencing unit 124 (labeled "sequence unit" in FIG. 1) for dispatch to execution units 130, 140, or 150.

Sequential fetcher 120 feeds instructions to both first instruction queue 101 and second instruction queue 102. Both instruction queues 101 and 102 are configured to shift instructions down from one queue location to the next each time an instruction is issued through selection MUX 105 to instruction decode unit 123 for further processing. The last storage element in first instruction queue 101 comprises a first latch 103 (LCH_0) and the last storage element in second instruction queue 102 comprises a second latch 104 (LCH_1). Latches 103 and 104 maintain the latched instructions available at the respective inputs of selection MUX 105 so that when one of the MUX inputs is selected, the instructions present at the selected input are transferred to instruction decode unit 123. Note the various elements illustrated, including latches 103 and 104, may be configured to handle only a single instruction at a time or multiple instructions. In a preferred form of the invention, various illustrated elements of processor 100 are capable of handling multiple instructions simultaneously. For example, each queue location in the instruction queues 101 and 102, and the latches 103 and 104 may include sufficient storage elements to accommodate five instructions. Thus, in this example, each instruction thread (T0 and T1) as well as the stream of interleaved instructions at the output of selection MUX 105 are actually five instructions wide. The invention encompasses any instruction width through threads T0 and T1.

The execution circuitry of processor 100 comprises the three separate execution units 130, 140, and 150 for executing sequential instructions. Each individual execution unit 130, 140, and 150, preferably executes instructions in a sequence of pipeline stages unique to the particular execution unit. Both the first execution unit 130 (EXU_1) and second execution unit 140 (EXU_2) in this example processor may be adapted to perform fixed-point mathematical and logical operations as well as load operations which load data from memory. The third execution unit 150 (EXU_3) in processor 100 may be adapted to perform complex fixed point operations. Third execution unit 150 may also perform store operations which store data to memory. Those skilled in the art will appreciate that various general purpose and floating point registers are associated with the execution units 130, 140, and 150 for temporarily storing operands and operation results. These registers are not shown in FIG. 1, since an understanding of their operation is not necessary for an understanding of the present selection controller arrangement. Numerous other elements may also be associated with execution units 130, 140, and 150, such as various queues, registers, or tables used to support out of order execution of instructions. These additional processor elements are also omitted from FIG. 1 so as not to obscure the invention in unnecessary detail.

Processor 100 processes each sequential instruction in distinct pipeline stages, namely, fetch, decode/dispatch, issue/sequence, execute, finish, and completion. Instructions from the two threads T0 and T1 stored in the two instruction queues 101 and 102, respectively, are interleaved into a single stream of instructions just prior to the decode/dispatch stage according to a priority rule enforced by selection controller 106. Because the instructions from the two threads are interleaved on a cycle-by-cycle basis prior to the decode/dispatch stage performed by instruction decode unit 123, the stages beginning with decode/dispatch may receive an instruction from either thread on any given clock cycle. For example, in any given clock cycle processor 100 may be completing an instruction from a first thread at completion unit 190, executing instructions from either the first or second thread at execution units 130, 140, and 150, and decoding an instruction from the second thread. Simultaneously processing instructions from distinct threads allows processor 100 to continue processing instructions even if one of the instruction threads stalls due to a long latency event associated with an instruction in that particular thread. For example, assume that an instruction from thread T0 (queued through first instruction queue 101) suffers some long latency event that prevents it from being immediately processed. Because instructions from the second instruction thread T1 (queued through second instruction thread 102) are interleaved with the instructions from thread T0, those instructions may continue to be processed and pass through second instruction queue T1.

During the fetch stage, sequential fetcher 120 retrieves one or more instructions associated with one or more memory addresses from instruction cache and MMU 118. Sequential fetcher 120 stores sequential instructions fetched from instruction cache and MMU 118 in either first instruction queue 101 to be part of the first thread of instructions T0, or second instruction queue 102 to be part of the second thread of instructions T1. Branch instructions for both threads are removed or folded out by sequential fetcher 120 to BPU 121 for execution. BPU 121 includes a branch prediction mechanism (not shown separately) which, in one embodiment, comprises a dynamic prediction mechanism such as a branch history table (not shown). This branch history table enables BPU 121 to speculatively execute unresolved conditional branch instructions by predicting whether or not the branch will be taken.

Instructions from the two threads of instructions passing through first and second instruction queues 101 and 102 are interleaved into a single stream of instructions that are delivered to instruction decode unit 123 for further processing. Instruction decode unit 123 decodes the instructions and passes the instructions to sequencing unit 124 for sequencing and dispatch to execution units 130, 140, and 150. Execution units 130, 140, and 150 execute instructions issued from sequencing unit 124. Once the issued instructions are fully executed, execution units 130, 140, and 150 store the results, if any, within the associated general purpose or other registers (not illustrated) and also notify completion unit 190 that the instructions have finished execution.

It will be appreciated that the particular processor structure shown in FIG. 1 is shown only for purposes of example and that the randomized instruction thread selection according to the present is not limited to use with this particular structure. For example, although processor 100 shows branch instructions folded out of the instruction stream by sequential fetcher 120, other processor structures may treat the branch instruction unit as another execution unit along with the other execution units 130, 140, and 150. In any event, the present randomized instruction thread selection according to the present invention may be incorporated into any simultaneous multi-thread processor.

It should also be noted that although the illustrated processor 100 is adapted to interleave two instruction threads T0 and T1 into a single interleaved stream for processing though the various processor pipeline stages after the fetch stage, other embodiments may be adapted to interleave more than two instruction threads into a single interleaved stream of instructions for processing. It will be noted that regardless of the number of instruction threads being simultaneously processed, an instruction (or set of instructions where the pipeline is multiple instructions wide) from only a single thread may generally be passed into the interleaved stream of instructions in any given clock cycle. Thus, where more than two threads are interleaved through a selecting device such as MUX 105, the apparatus must include logic for producing MUX control signals suitable for selecting a particular one of the threads for transfer through the MUX. In the two-thread form of the invention shown in FIG. 1, the MUX control signal may be applied through the signal path 154. However, control signals for a selection MUX having more than two inputs will require additional signal paths to accommodate the required MUX control signals.

It should also be noted that certain embodiments of the present invention may have the ability to hold instructions from one or both instruction threads T0 and T1 so that valid instructions from the respective held thread do not pass on for further processing. The hold capability may be implemented through hold signals applied to the two latches 103 and 104. FIG. 1 shows dashed lines 152 and 153 from selection controller 106 to each latch 103 and 104. Where the hold capability is implemented, selection controller 106 may be used to generate the required hold signals for each thread and apply those signals to lines 152 and 153. Further details regarding implementations of the invention employing thread hold signals are included in related U.S. application Ser. No. 10/424,530, entitled "METHOD AND APPARATUS FOR SELECTING AN INSTRUCTION THREAD FOR PROCESSING IN A MULTI-THREAD PROCESSOR," which is incorporated herein by reference.

Figure 2:
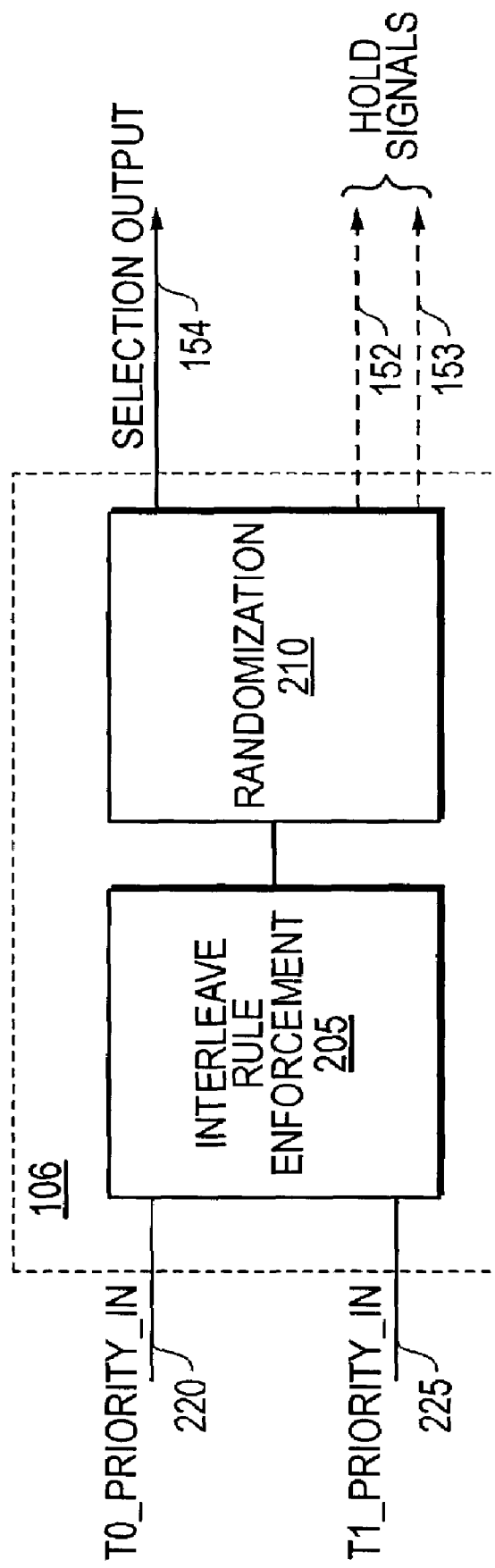
FIG. 2 is a block diagram of a selection controller embodying the principles of the invention.

FIG. 2 illustrates a selection controller 106 according to one form of the invention. Selection controller 106 is adapted for controlling the interleaving of two different instruction threads and includes an interleave rule enforcement component 205 coupled to a randomization component 210. The illustrated selection controller 106 also includes two inputs 220 and 225 and at least one output 154. Additional outputs may comprise hold signals applied at outputs 152 and 153 discussed above with reference to FIG. 1. The inputs to selection controller 106 comprise priority signals indicating the priority of the two threads being interleaved. For example, each priority signal may indicate a processing priority of between 1 and 7 assigned to a particular instruction thread by software. The output 154 from selection controller 106 comprises a control signal used to control the interleaving of the two threads. The various components of selection controller 106 ensure that instruction threads being executed by the data processor are interleaved in such a way that the frequency with which individual instructions are chosen from the multiple threads is randomized over short periods of time, but adheres to a priority rule over longer periods of time.

Interleave rule enforcement component 205 receives the priority signals for each instruction thread being processed. In the illustrated embodiment shown in FIG. 2, these priority signals comprise T0_Priority_In the first thread priority on input 220 and T1_Priority_In or second thread priority on input 225. In one preferred form of the invention, the first thread priority at input 220 and second thread priority at input 225 each comprises three-bit logic signals indicating one of seven different priority levels. These priorities are used by interleave rule enforcement component 205 to determine the portion of processor time that should be allotted to each instruction thread, and thus the frequency with instructions from the multiple instructions threads are interleaved into the single interleaved stream for processing. For example, if the first thread priority at 220 indicates that the priority of a first instruction thread is 4, and the second thread priority at 225 indicates that the priority of a second instruction thread is 1, a desired priority rule may dictate that an instruction from the first instruction thread be selected for the interleaved stream at a greater frequency (i.e., more often) than instructions from the second instruction thread.

An interleave rule may dictate that instructions be interleaved according to a simple ratio. Assume, for example, that the priority of a first thread is 6, and the priority of a second thread is 3. An interleave rule according to the invention might reduce these thread priorities to the simple ratio of 2-1, two instructions from the first thread for each instruction from the second thread. One preferred rule enforced by interleave rule enforcement component 205 employs the formula $\frac{1}{2}^{(\mid X-Y\mid+1)}$, where X is the first thread priority, and Y is the second thread priority. Using the priority of 6 for the higher priority thread and 3 for the lower priority thread, this formula produces the result $\frac{1}{16}$, meaning that one instruction from the lower priority thread will be interleaved into the interleaved stream for each sixteen instructions included in the stream. It will be understood that the present invention is not limited by the particular priority rule enforced through the interleave rule enforcement component 205. Furthermore, although the previous examples involve interleaving instruction threads on a cycle-by-cycle basis, various other priority rules could be used in which processor time is allocated to threads interleaved on some other basis. For example, instruction threads could be interleaved according to some rule on the basis of groups of cycles rather than on a cycle-by-cycle basis.

Regardless of the priority rule employed, the output of interleave rule enforcement component 205 provides an output signal that can be used to select a particular thread for processing. Randomization component 210 receives as its input the selection signal output from interleave rule enforcement component 205 then inserts a randomization to produce a randomized selection signal at selection controller output 154. Randomization component 210 does not, however, alter the overall priority rule enforced by interleave enforcement component 205.

Figure 3:
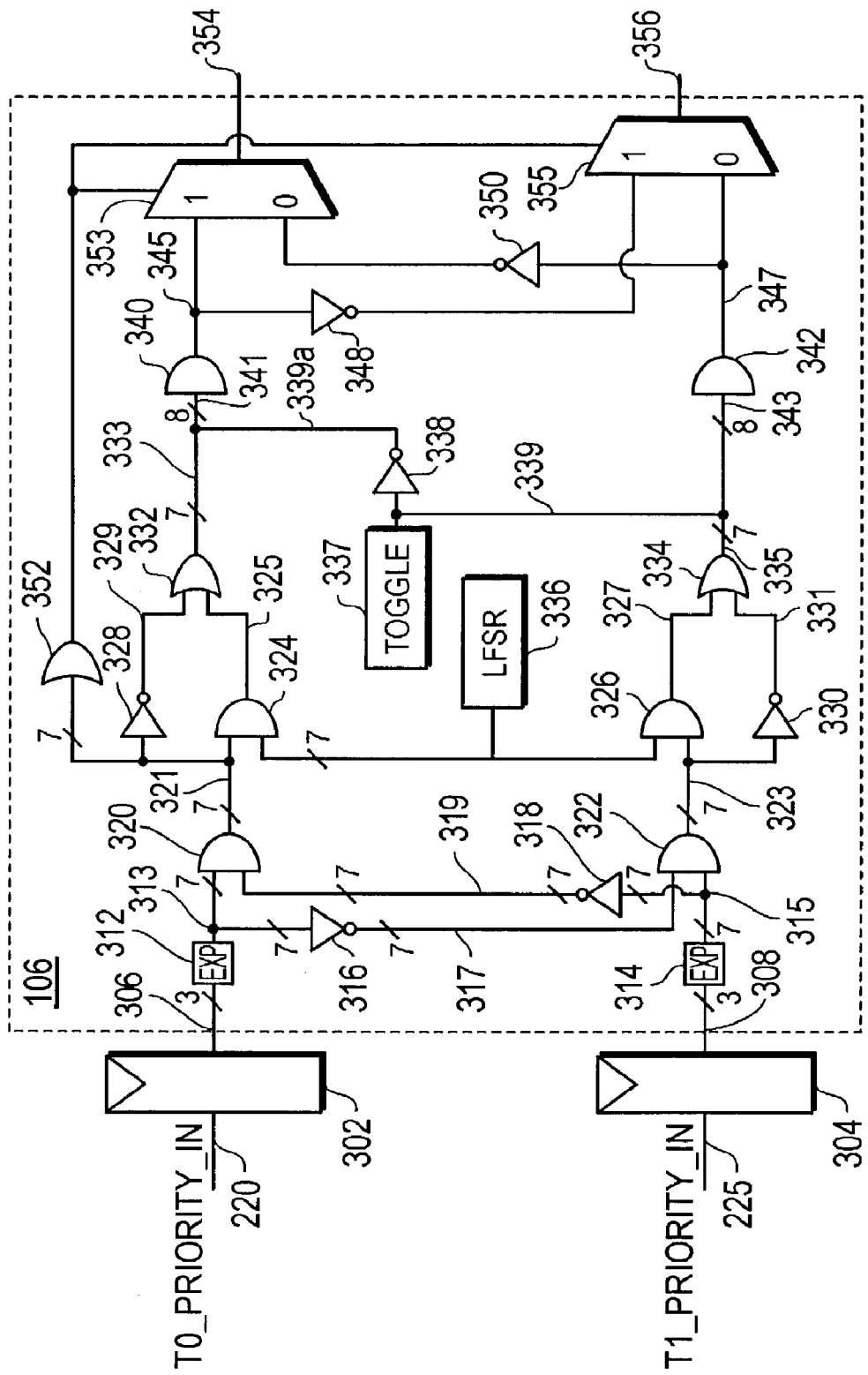
FIG. 3 is a schematic diagram of a circuit combining the interleave rule enforcement and the randomization elements of the selection controller illustrated in FIG. 2.

FIG. 3 illustrates a preferred form of selection controller 106 for enforcing an instruction thread interleaving rule and for inserting a randomization into the interleaving control output. The specific circuit illustrated in FIG. 3 integrates the functions of the interleave rule enforcement component 205 shown in FIG. 2 and the functions of randomization component 210 shown in FIG. 2 into a single interleave rule enforcement and randomization circuit. This preferred selection controller circuit 106 includes mask logic for generating a mask from the first thread priority signal (T0_Priority_In) at input 220 and the second thread priority signal (T1_Priority_In) at input 225, a random or pseudo random number generator for generating a random or pseudo random number, logic for comparing a random or pseudo random number with the mask, and logic for combining the results of the comparison to produce a thread selection output.

The arrangement of selection controller 106 illustrated in FIG. 3 is made up of two of two branches. One branch is associated with the first thread T0 and the first thread priority signal at input 220. This branch of circuit 106 will be referred to as the first thread or T0 branch. The other branch is associated with the second thread T1 and the second thread priority sigual at input 225. This branch associated with input 225 will be referred to as the second thread or T1 branch. Since both the T0 and T1 branches include the same components and perform the same functions, the T0 branch will be used as the basis of the following discussion unless otherwise indicated. Referring to the far left in FIG. 3, input 220 carrying the first thread priority signal is coupled to latch 302. The output of latch 302 is applied to input node 306 to branch T0 of thread selection controller circuit 106. Latch 302 latches and holds the first thread priority signal at input node 306 as long as the priority of the first thread or T0 thread remains unchanged. This thread priority is set and changed under software control and may also be modified under hardware control. Hardware modification of the thread priority inputs is the subject of related and concurrently filed U.S. patent application Ser. No. 10/424,530, entitled "METHOD AND APPARATUS FOR SELECTING AN INSTRUCTION THREAD FOR PROCESSING IN A MULTI-THREAD PROCESSOR," which is incorporated herein by reference.

Node 306 is connected to the input of expander 312. Expander 312 expands the first thread priority value bitwise to produce an expanded priority signal. In the illustrated embodiment, the priority signal at node 306 is a 3 bit binary coded signal indicating a priority in the range of 1 to 7. Expander 312 expands the 3 bit signal at node 306 to produce a 7 bit logic signal at node 313 in which a number of bits corresponding to the priority value are set. For example, if the first thread priority at node 306 is 5, that is a 3 bit binary value 101, then the 7 bit expanded signal at node 313 will be 0011111. If the first thread priority is 3, then the 3 bit logical signal at node 306 will be 011, and the 7 bit expanded signal at node 313 will be 0000111.

Once expander 312 has generated the 7 bit, expanded first priority signal at node 313, inverter 316 performs a bitwise inversion of the expanded priority signal and directs the inverted signal through node 317 to the input of AND gate 322, which is part of the T1 branch. The T1 branch, having similarly expanded the second thread priority value to produce an expanded signal at node 315 and inverted the second thread priority signal at inverter 318, directs the inverted T1 priority signal through node 319 to the input of AND gate 320. AND gate 320 performs a bitwise logical AND operation to combine the expanded and inverted second thread priority signal with the expanded first thread priority signal to generate a signal referred to herein as the T0 mask at node 321. Note that the 7 bit AND result at node 321 represents a difference between the priority of the first thread priority value and the second thread priority value.

The 7 bit signal at node 321 provides one input to AND gate 324 and the input to inverter 328. The signal at node 321 is also coupled to the input of OR gate 352, which serves as a MUX controller for both branches T0 and T1 as will be described further below. The output of a linear feedback shift register (LFSR) 336 provides the other input to AND gate 324. The LFSR 336 output comprises a pseudo random number up to seven bits in length produced each clock cycle. It will be appreciated that although LFSR 336 is shown for producing the random or pseudo random number in the illustrated randomized thread selection control circuit 106 of FIG. 3, any suitable random or pseudo random number generator may be substituted for LFSR 336. Regardless of how the pseudo random or random number is produced, AND gate 324 performs a bitwise logical AND operation between the pseudo random or random number and the T0 mask at node 321 to generate a randomized mask signal at node 325. For example, if the pseudo random number generated by LFSR 336 is 0001001, and the T0 mask is 0001000, then the randomized mask signal at node 325 will be 0001000.

The randomized mask signal at node 325 provides one input to OR gate 332. The output of inverter 328 produces an inverted mask signal at node 329, which represents the other input to OR gate 332. It should be noted that both inputs to OR gate 332 are 7 bits wide. OR gate 332 performs a bitwise logical OR operation on these two 7 bit inputs (the randomized mask signal at node 325 and inverted mask signal at node 329) and applies the 7 bit output to node 333. As a result of this OR operation, if a particular bit position in either the inverted T0 mask or the randomized T0 mask contains a logical 1, that same bit position in the signal at node 333 will also contain a logical 1.

Circuit 106 in FIG. 3 also includes a toggle arrangement 337 for generating a single bit logical signal that toggles back and forth between logical states with each clock cycle of the processor in which circuit 106 is employed. The output of toggle arrangement 337 is applied to node 339 and inverted by associated inverter 338 to produce a single bit signal at node 339a. This single bit at node 339a is appended to the 7 bit signal at node 333 to produce an 8 bit input at node 341 which provides the input to combining AND gate 340. AND gate 340 performs a logical AND operation on the 8 bit signal at node 341 to generate a single bit output at node 345.

Before proceeding further with the discussion of the T0 branch of circuit 106 illustrated in FIG. 3, it will be noted that T1 branch of the circuit includes similar circuit elements to the T0 branch and performs corresponding operations on the second thread priority signal applied at input 225. Latch 304 holds the 3 bit priority signal at node 308 and expander 314 expands the priority value to a 7 bit signal at node 315. AND gate 322 bitwise ANDs the 7 bit signal at node 315 with the inverted 7 bit signal at node 317 and applies the 7 bit output to node 323. This signal at node 323 represents a 7 bit mask of the second thread priority value applied at input 225. AND gate 326 produces a randomized second thread mask by bitwise ANDing the pseudo random number from LFSR 336 with the signal at node 323 and at OR gate 334, this randomized second thread mask output at node 327 is bitwise ORed with the inverted signal at node 331 from inverter 330 to generate a 7 bit signal at node 335. The single bit at node 339 is appended to this 7 bit signal at node 335 to produce an 8 bit signal at node 343 which provides the input to combining AND gate 342. It will be noted that the appended bit at node 343 will always be opposite to the bit appended at node 341 in the T0 branch. Similarly to the operation performed by combining AND gate 340, combining AND gate 342 logically ANDs the 8 bit input at node 343 to produce a single bit output at node 347.

The single bit signal at node 345 provides one input to a T0 branch MUX 353, while the single bit signal at node 347 provides one input to a T1 branch MUX 355. The second input to T0 branch MUX 353 comprises the inverted signal produced by inverting the signal at node 347 with inverter 350. Similarly, the second input to T1 branch MUX 355 comprises the inverted signal produced by inverting the signal at node 345 with inverter 348. OR gate 352 logically ORs the first thread mask signal at node 321 to produce a single-bit MUX select signal which is applied to control both MUXs 353 and 355. It will be noted that the output of OR gate 352 will equal 1 when the first thread priority (T0_Priority_In on input 220) is greater than the second thread priority (T1_Priority_In on input 225). However, the output of OR gate 352 will equal 0 when the two input priorities are equal or the second thread priority is greater than the first thread priority. The MUX select signal controls MUX 353 and MUX 355 to connect one input each to output nodes 354 and 356, respectively.

The signal at output node 354 comprises a binary signal that may be used to control the selection MUX 105 shown in FIG. 1. Thus, the signal at node 354 represents the selection control signal at node 154 shown in both FIGS. 1 and 2. The signal at node 356 represents the binary complement of the signal at node 354 and thus may also be used as the control signal at node 154 in FIGS. 1 and 2 to control thread selection MUX 105 in FIG. 1, by merely reversing the logic of the MUX with respect to the logic used with the signal at node 354 as the control signal.

As will be illustrated in the examples set out below, either output 354 or 356 may be used to enforce the instruction interleave rule that the lower priority thread will be selected once for each $2^{(|X-Y|+1)}$ processor clock cycles where $|X-Y|$ equals the absolute difference between the priority values assigned to the first and second instruction threads. Due to the randomization introduced through the comparison of the mask value and the pseudo random number generated at LFSR 336, the values at output nodes 354 and 356 will vary unpredictably from cycle to cycle. That is, where the respective mask at node 321 or 323 would have dictated a certain value at output node 354 and 356, respectively, the randomization randomly changes the output to the opposite of what would have been dictated according to the desired instruction interleave rule. However, because the randomization is as likely to change the ultimate output at nodes 354 and 356 as to not change the ultimate outputs, the desired instruction interleave rule is maintained over time.

Either of the signals at nodes 354 and 356 may be used to control MUX 105 for passing instructions from the first and second queues 101 and 102 shown in FIG. 1. In the logic of the specific circuit shown in FIG. 3, a 0 value at node 354 would cause MUX 105 to select the first thread and pass an instruction or instructions from first queue 101 in a given clock cycle. A value of 1 at node 354 would cause MUX 105 to pass instructions from the second queue 102 in a given clock cycle. If the signal at node 356 were used to control MUX 105, a 0 value at node 356 would cause MUX 105 to pass an instruction from second queue 102 in a given clock cycle and a value of 1 at node 356 would cause MUX 105 to pass an instruction from first queue 101 in a given clock cycle. The signals at nodes 354 and 356 may also be used to generate the control signals applied at 152 and 153 shown in FIG. 1. Related U.S. patent application Ser. No. 10/424,530, filed concurrently herewith and entitled "METHOD AND APPARATUS FOR SELECTING AN INSTRUCTION THREAD FOR PROCESSING IN A MULTI-THREAD PROCESSOR" describes an embodiment of the present invention employing the signals at nodes 354 and 356 as control signals for the two instruction queues 101 and 102.

It will also be appreciated that in forms of the invention in which more than two instruction threads are being interleaved, additional logic will be needed to select a single instruction thread for interleaving into the interleaved instruction stream. This additional logic may be implemented in a number of different ways given the present invention. For example, instruction threads may be handled in sets of two, so that in a processor interleaving four instruction threads, a selection controller may employ two sets of the circuitry illustrated in FIG. 3, with additional logic to force selection of only a single instruction thread.

The following examples may provide a more thorough understanding of the operation of the specific circuit implementation shown in FIG. 3.

EXAMPLE 1

Assume that the first thread priority, T0_Priority_In at node 220, indicates a priority of 3 for the first thread, thread T0, and that the second thread priority, T1_Priority_In at node 225, indicates a priority of 2 for the second thread, thread T1. The signal at node 306 would be 011, and the signal at node 308 would be 010. Expanders 312 and 314 will expand the signals so that the signal at node 313 is 0000111, and the signal at node 315 is 0000011. Note that in this example, a priority of 3 expands to a 7 bit signal with the three ones, and a priority of 2 expands to a 7 bit signal with two ones. The inverters 316 and 318 invert their respective signals bitwise, so that the inverted signal at node 317 is 1111000 and the inverted signal at node 319 is 1111100. AND gate 320 then performs a bitwise logical AND operation on its two inputs, 0000111 from node 313 and 1111100 from node 319. The result of the bitwise logical AND operation produces a T0 or first thread mask signal at node 321 of 0000100. AND gate 322 likewise performs a bitwise logical AND operation on its two inputs, 1111100 from node 317 and 0000011 from node 315, resulting in a T1 or second thread mask at node 323 of 0000000.

LFSR 336 generates a pseudo random number in a given clock cycle, for example 1100100, and transfers the number to one input of AND gate 324. It is interesting to note that of the 7 bits output by LFSR 336, only bits coinciding with logical ones in T0 mask have any relevant effect. The other input to AND gate 324 is the signal at node 321 which has a value of 0000100. AND gate 324 performs a bitwise logical AND on its two input signals to produce a signal having a value of 0000100 at node 325. Inverter 328 inverts the signal at node 321 to produce an output of 1111011 at node 329. OR gate 332 then performs a bitwise logical OR operation on the signals at nodes 329 and 325 to produce a 7 bit randomized mask signal at node 333 having a value of 1111111.

Assume that the output of toggle 337 is 0 in this particular clock cycle, so that inverter 338 generates a 1. This value of 1 is appended to the 7 bit randomized mask signal to produce an 8 bit randomized mask signal of 11111111 at node 341. Finally, AND gate 340 performs a logical AND operation on the 8 bit randomized mask to combine the 8 bit comparison output into a single bit signal having a value of 1 at node 345.

Turning now to the T1 branch beginning at node 323, this node holds the value 0000000 as described above. With the LFSR 336 output still having a value of 1100100, the inputs to AND gate 326 will be 1100100 and 0000000, to produce an output of 0000000 at node 327. Inverter 330 generates an output of 1111111 at node 331 and the bitwise logical OR performed by OR gate 334 produces a 7 bit randomized mask signal of 1111111 at node 335. Since toggle 337 toggles to 0 during the pertinent clock cycle, a 0 is appended to the 7 bit randomized mask signal to produce an 8 bit randomized mask signal of 11111110 at node 341. Finally, AND gate 342 combines the 8 bit comparison output signal at node 343 into a single bit signal having a logical value of 0 at node 347.

Once the value of the signals at nodes 345 and 347 have been determined, inverters 348 and 350 cross couple the inverted signals to multiplexers 353 and 355. This cross coupling places a logical 1 on both inputs of MUX 353 and a logical 0 on both inputs of MUX 355. Since the input of OR gate 352 is 0000100, its output 1. Placing a 1 on the control inputs of MUXs 353 and 355 produces a 1 at node 354 and a 0 at node 356. One of the signals at nodes 354 and 356 can then be selected for use as a selection control signal.

EXAMPLE 2

The following example tracks Example 1, except that to clarify the operation of the circuit illustrated in FIG. 3, the processing priority of the T0 thread (T0_Priority_In) is assumed to be 4. The processing priority of the T1 thread (T1_Priority_In) remains at 2. Given these thread priorities, the signal at node 306 is 100, and the signal at node 308 is 010. Expanders 312 and 314 will expand the signals so that the signal at node 313 is 0001111, and the signal at node 315 is 0000011. Note that a priority value of 4 expands to a 7 bit signal with the four ones, and a priority of 2 expands to a 7 bit signal with two ones. The inverters 316 and 318 invert their respective signals bitwise, so that the signal at node 317 is 1110000 and the signal at node 319 is 1111100. AND gate 320 then performs a bitwise logical AND operation on its two inputs, 0001111 from node 313 and 1111100 from node 319. The results of the bitwise logical AND operation produce a T0 or first thread mask at node 321 of 0001100. AND gate 322 likewise performs a bitwise logical AND operation on its two inputs, 1110000 from node 317 and 0000011 from node 315. The resulting T1 or second thread mask at node 323 is 0000000, just as in the previous example.

For purposes of comparison, assume that the LFSR 336 generates the same pseudo random number that is used in Example 1. Assume, therefore, that LFSR 336 generates a signal having a value of 1100100, and provides the signal to one input of AND gate 324. The other input to AND gate 324 is the T0 mask, which has a value of 0001100. AND gate 324 performs a bitwise logical AND on its two input signals to produce a signal having a value of 0000100 at node 325, which is the same value produced in the first example. Inverter 328 inverts the T0 mask to produce an output of 1110011 at node 329. OR gate 332 then performs a bitwise logical OR operation on the signals at nodes 329 and 325 to produce a 7 bit randomized mask signal at node 333 having a value of 1110111. Note that this example produces a different signal at node 333 than that produced in Example 1 because of the randomization added through the third and fourth bit locations in the pseudo random number produced by LFSR 336. Had both of the third and fourth bit locations of the pseudo random number from LFSR 336 been equal to 1, then the result at node 333 would have been 1111111.

Assume that the output of toggle arrangement 337 is 0, just as in the previous example, so inverter 338 generates an inverted toggle bit of 1. The inverted toggle bit, is appended to the 7 bit T0 randomized mask signal to produce an 8 bit T0 randomized mask signal of 11101111 at node 341. Finally, AND gate 340 performs a logical AND operation on the 8 bit randomized mask to combine the 8 bit comparison output into a single bit signal having a value of 0 at node 345. Contrast this with Example 1, in which the value of the signal at node 345 was 1.

The T1 branch of the circuit performs corresponding operations on the second thread priority. Still assuming that LFSR 336 generates a pseudo random number having a value of 1100100, the inputs to AND gate 326 will be 1100100 and 0000000. The output of AND gate 326 is 0000000 at node 327, just as in Example 1. Inverter 330 generates an output of 1111111 at node 331. A bitwise logical OR performed by OR gate 334 produces a 7 bit randomized mask signal of 1111111 at node 335. Since the output of toggle 337 is 0, a 0 is appended to the 7 bit T1 randomized mask signal to produce an 8 bit T1 randomized mask signal of 11111110 at node 341. Finally, AND gate 342 combines the 8 bit T1 comparison output signal at node 343 into a single bit signal having a logical value of 0 at node 347.

Once the value of the signals at nodes 345 and 347 have been determined, inverters 348 and 350 cross couple the inverted signals to multiplexers 344 and 346. Unlike Example 1, in which both inputs of MUX 353 were logical 1s and both inputs of MUX 355 were logical 0s, in this case input 1 of MUX 353 is 0, input 0 of MUX 353 is 1, input 1 of MUX 355 is 1, and input 0 of MUX 355 is 0. In this case, the input of OR gate 352 is 0001100, which is different from the input of the same gate in Example 1. The different input, however, still produces an output of 1 to be applied to the control inputs of MUXs 353 and 355. Placing a 1 on the control inputs of MUXs 353 and 355 causes each MUX to connect its 1 input to node 354 or 355, respectively. As a result, a 0 is placed on node 354 and a 1 is placed at node 356. Note that this is exactly opposite the result in Example 1. Thus, even though the priority of the first instruction thread is higher in Example 2 as compared to Example 1, and we would thus predict that the same instruction thread would be selected as in Example 1, the randomization introduced through the mask comparison with the pseudo random number from LFSR 336 causes the thread selection result to be different from Example 1.

It will be noted from the above examples and the earlier description of the circuit shown in FIG. 3 that each branch of the circuit produces the appropriate output to enforce the desired interleave ratio. However, each respective branch of the parallel structure made up of branches T0 and T1 computes an alternate possibility for the ratio where the values of T0 and T1 are not equal, the two possibilities being either that T0 is greater than T1 or T1 is greater than T0. The final MUX select provided through MUXs 353 and 355 causes the thread having the greater priority value to be selected more frequently in the enforced ratio. It will be appreciated that the present method of randomizing thread selection while maintaining some desired overall interleave rule is not limited to this particular parallel branch circuitry. Rather, the invention encompasses any circuitry for randomizing thread selection within the confines of a desired interleave rule, whether parallel branch circuitry is used as shown in FIG. 3 or circuitry that does not include parallel branches for producing the desired thread selection signal.

The above described preferred embodiments are intended to illustrate the principles of the invention, but not to limit the scope of the invention. Various other embodiments and modifications to these preferred embodiments may be made by those skilled in the art without departing from the scope of the following claims. For example, the logic and other circuitry illustrated provide specific examples of how the disclosed invention can be implemented, but the disclosed circuits may be implemented in positive or negative logic. Also, different combinations of logic gates could be used to achieve the same results, and such changes should be considered equivalents of the structure disclosed. Numerous different arrangements may be used to insert the desired randomization into the thread selection process or to select between different threads.

The invention claimed is:

1. A method of processing multiple threads of instructions in a data processor, the method including:
    (a) interleaving instructions from a first thread of instructions in the data processor with instructions from at least one additional thread of instructions in the data processor, the instructions from the first thread of instructions and the at least one additional thread of instructions being interleaved according to a priority rule between the first thread of instructions and the at least one additional thread of instructions to produce an interleaved stream of instructions in the data processor; and
    (b) inserting a randomization into the interleaving step while preserving the priority rule by (i) generating a thread selection signal indicating a thread to be processed (ii) generating a mask from a first thread priority signal associated with the first thread of instructions and from a respective additional thread priority signal associated with each additional instruction thread; (iii) generating a random number or a pseudo random number; and (iv) comparing the mask to the random number or the pseudo random number to generate a randomized mask.

2. The method of claim 1 wherein the step of interleaving instructions is performed on a cycle-by-cycle basis.

3. The method of claim 1 wherein the step of interleaving instructions includes the steps of:
    (a) inverting the mask to generate an inverted mask; and
    (b) comparing the randomized mask with the inverted mask.

4. A method for producing a thread selection signal for use in selecting an instruction for processing in a data processor, the instruction being selected from a plurality of instruction threads, and the method including the steps of:
    (a) generating a mask from priority signals associated with the plurality of instruction threads, the priority signals indicating a thread priority for respective ones of the plurality of instruction threads;
    (b) generating a random number or pseudo random number suitable for comparison with the mask;
    (c) comparing the mask to the random number or pseudo random number to produce a randomized mask; and
    (d) generating the thread selection signal from the randomized mask.

5. The method of claim 4 wherein the step of generating the mask includes the step of comparing a first priority signal to a second priority signal.

6. The method of claim 5 further including the step of inverting one of the first priority signal or the second priority signal prior to the step of comparing the first priority signal to the second priority signal.

7. The method of claim 4 wherein the step of generating the random number or pseudo random number is performed with a linear feedback shift register.

8. The method of claim 4 further including the step of expanding the priority signal bitwise prior to the step of generating the mask.

9. The method of claim 4 wherein the step of generating the thread selection signal from the randomized mask further includes the steps of:
    (a) inverting the mask to generate an inverted mask; and
    (b) comparing the randomized mask with the inverted mask.

10. The method of claim 9 further including the step of combining the result of the comparison between the randomized mask and the inverted mask.

11. The method of claim 10 further including the step of combining a toggle bit with the result of the comparison between the randomized mask and the inverted mask, the toggle bit changing logical level at a processor clock cycle frequency.

* * * * *